3,608,282
FILTERING SYSTEMS
Otis E. Ririe, Bartlesville, Okla., assignor to
Phillips Petroleum Company
Filed Dec. 13, 1968, Ser. No. 783,653
Int. Cl. B01d 46/04
U.S. Cl. 55—302                                    4 Claims

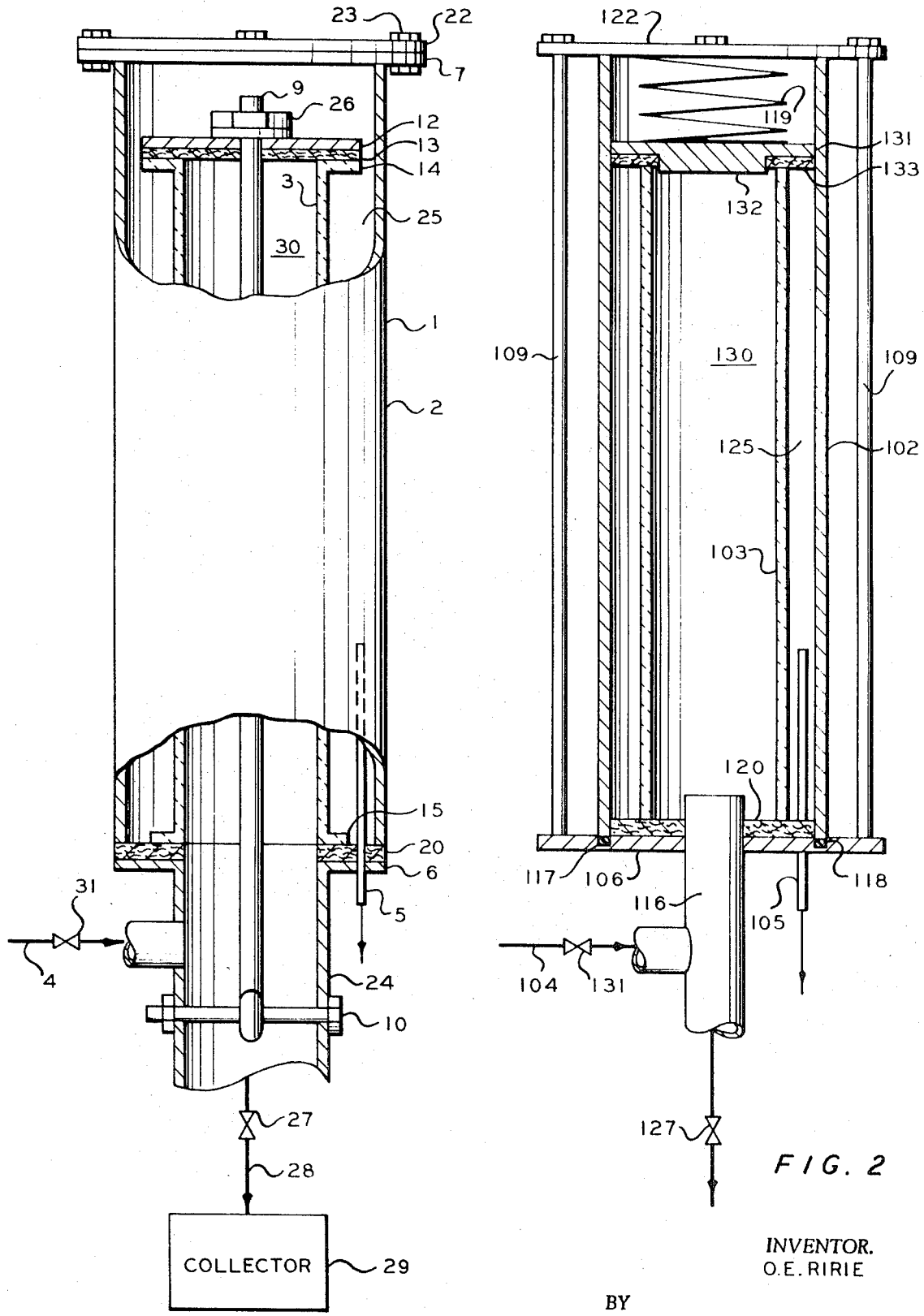

ABSTRACT OF THE DISCLOSURE

An apparatus for separating particulate matter from a fluid stream which involves means for passing the fluid stream through a filter, means reversing the flow of the fluid to remove the matter from the filter and permitting the removed matter to pass into porous collecting means.

---

This invention relates to phase separations.

In one of its more specific aspects, this invention relates to the recovery of particulate matter from a stream in which it is suspended or entrained.

In many systems, it is desirable to continuously filter a process stream in which a solid is contained in a liquid or a gas. Frequently, a plurality of filter elements are employed in parallel, one being engaged in filtering while the other is being cleaned or is standing idle awaiting use.

There has now been developed a phase separation method which involves a novel method of rapidly cleaning a filter medium. This method is applicable to any stream having particulate matter suspended in a continuous phase, such as solids in liquids, and is particularly applicable to a stream which has particulate matter suspended in a gaseous phase.

According to the apparatus of this invention there is provided a process for separating a particulate solid from an entraining fluid which comprises passing the entraining fluid through a foraminous surface, retaining at least a portion of the particulate matter on the foraminous surface, and reversing the flow through the foraminous surface to impact-remove the particulate matter from the foraminous surface and to carry it into a collection means.

Also according to this invention, there is provided apparatus for carrying out this invention which comprises a filter positioned within a housing, a closed annulus formed between the housing and the filter, a first conduit in open communication with a first surface of the filter, closure means positioned in the first conduit, a second conduit in open communication with a second surface of the filter, and closure means positioned in communication with said first surface of the filter.

In one of its embodiments the invention comprises a multiple filter system in which the filters operate sequentially.

In a preferred embodiment of the invention, collection means are positioned downstream of the closure means to collect the particulate matter removed from the surface of the filter and carried through the closure means.

Accordingly, it is an object of this invention to provide an easily maintainable filtering system.

It is another object of this invention to provide a self-cleaning filtering system.

In general, the apparatus of this invention is applicable to any filtering process, whether it filters solids from a gas or solids from liquids. Similarly, the method and apparatus of this invention are applicable to any filtering process in which the flow of the continuous phase through a foraminous surface can be reversed to, in effect, shock-remove that particulate matter deposited on the filter surface. For example, the apparatus of this invention is particularly suited for obtaining carbon black samples from smoke and for the filtration of the smoke using filter bags as the foraminous medium.

It will be understood that some of the particulate matter retained at the one surface of the foraminous material may not adhere thereto. Nevertheless, the reverse-flow can be employed to remove such matter from the proximity of the filter and into the collector means described below.

The apparatus of this invention will be more easily understood if explained in conjunction with the attached drawings which schematically represent two embodiments encompassing a single element filter employed in the separation of a solid from a gas.

FIG. 1 indicates schematically, in elevation, a filter having internal retention means.

FIG. 2 indicates schematically, in elevation, a filter having external retention means.

Referring now to FIG. 1, there is shown filter 1 having housing 2 containing filter element 3, inlet conduit 4 having valve 31 positioned therein being provided for the introduction of material to be filtered, outlet conduit 5 being provided as an exit for the continuous phase leaving the filter.

Housing 2 is of any satisfactory configuration for enclosing the filter, having lower shoulders 6 and top flange 7 fitted with cover plate 22 affixed thereto by means of bolting 23. Rod 9 extends centrally through housing 2, rod 9 being anchored by rod hinge 10 at its one end, and being maintained in a retaining relationship to filter element 3 by means of element plate 12 and nut 26, positioned thereagainst at its upper threaded end.

Cover plate 22 is removable from flange 7 of housing 2 to permit insertion of filter element 3 on foot gasket 20 bearing on lower shoulders 6. Element 3 is adapted with head flange 14 and foot flange 15 such that with foot flange 15 seated on foot gasket 20 and head gasket 13 on head flange 14, element plate 12 permits element 3 to be sealably positioned between foot gasket 20 and head gasket 13. Access to bore 30 of filter element other than through inlet conduit 4 is prevented when after-discussed valve 27 is in the closed position.

Filter element 3 may be of any suitable configuration. A tubular filter such as Silas Flotronics Ceramic element Type OE–1610, No. 80477–05 having a .7 micron absolute retention is suitable, as are bag-type filters, plate filters and the like.

Of significance is the pressure drop through the filter, particularly in consideration that cleaning of the filter upon flow reversal is based upon "shock cleaning" the filtered particulate matter from its surface. In other words, upon the opening of a valve, as hereinafter discussed, back-flow of the continuous phase through the filter element must be in such large quantities and at such a low pressure drop and in such uniform distribution over the surface of the filter that the filtered matter is removed therefrom by impact. Accordingly, it is preferred that the low pressure drop filter element be such as to have a pressure drop across its wall of from about 0.02 inch water to about 0.5 inch water, preferably from about 0.5 to about 0.2, under the conditions at which the filter operates.

Inlet 4 allows entrance of the filterable material into lower housing 24 and up around rod 9 into the interior of filter element 3. Prevented from existing through plate 12, the continuous phase passes through the walls of filter element 3, leaving some particulate matter adhering on the internal surfaces of filter element 3. The continuous phase passes through filter element 3 into annulus 25 formed between filter element 3 and casing 2 and out of the apparatus through outlet conduit 5. Outlet conduit 5 advantageously extends up into annulus 25 above foot flange 15.

Situated below rod hinge 10 is valve 27. Valve 27 is preferably a quick-opening ball valve, such as a Jamesbury 1" Ball Valve Type A–22.

In any instance, the valve will be one which can be opened at such a rate as to produce "shock cleaning" of the filter element upon the reversal of continuous phase flow through the filter element. If electrically operated, a snap-opening solenoid valve is satisfactory.

Beneath the valve and in open communication with it, is outlet conduit 28 and collector 29, the latter being constructed of any porous material suitable for collecting and retaining that particulate matter which is removed from the internal surface of element 3 during the cleaning operation.

During the filtering operation, with valve 27 in the closed position and access being had into bore 30 through conduit 4 and open valve 31, the continuous phase, containing partciulate matter, enters bore 30. The continuous phase passes through filter elmeent 3 into annulus 25 and leaves through outlet conduit 5. The particulate matter does not pass through filter element 3 and adheres to the internal wallls thereof.

In cleaning filter element 3, flow into housing 2 through inlet conduit 4 is discontinued by closing valve 31 in inlet conduit 4. Valve 27 is then opened with the result that the continuous phase flows in reverse through the wall of filter element 3, the impulse created by the rapid opening of valve 27 acting to shock-clean the particulate matter from the internal walls of element 3. The particulate matter so removed drops under gravity or is carried by the reverse-flowing continuous phase through valve 27, through conduit 28, and into collector 29, wherein the particulate matter is retained, the continuous phase passing through the porous walls of the collector.

Valve 27 is then closed and the filter is put back in operation by opening valve 31 in inlet conduit 4. In some instances, it may be necessary to repeat the cleaning cycle, and, of course, automatic opening and closing of these valves can be incorporated in the system.

A second embodiment is shown in FIG. 2.

Entrance up into the filter element 103 is through conduit 116 which extends through base 106 which is grooved peripheral to conduit 116 to formed gasket seat 117. A gasket 118, preferably a ring gasket, occupies gasket seat 117 with housing 102 being seated on gasket 118.

Affixed to the upper end of housing 102 is cover flange 122 which is held in place by clamping rods 109, at least two of which extend from base 106 through cover plate 122. Housing 102 forms a leak-proof joint with gasket 118. Positioned on base 106 is gasket 120 against which element 103 is sealably retained in place. Element 103 is positioned within housing 102 in spaced relationship thereto to form annulus 125 from which conduit 105 carries out the filtered continuous phase.

At the upper end of element 103 is element guide plate 131 which contains a projection 132 which fits into bore 130 of filter element 103 with gasket 133 peripheral thereto and receptive to the upper circumference of element 103. Spring 119 is compressed against element guide plate 131 by means of cover plate 122 such that the upper circumference of element 103 is sealed in position against gasket 133. The continuous phase entering bore 130 from conduit 116 is accordingly forced through the walls of the filter element with no leakage through either the top or bottom sealing arrangements.

If desirde, the filtering apparatus can be composed of a plurality of filtering elements in parallel operation, each being adapted for operation for a specific period of time on the filtering cycle and on the reverse-flow, impact cycle. However, the single element filter is so readily and rapidly cleaned that operation is almost continuous and the use of a single element will be satisfactory in the majority of instances.

While the apparatus of this invention has been described with reference to certain preferred embodiments, adaptations can be made to employ suitable equivalents. For example, stainless steel filter elements can be employed; rod 9 can be formed of a conduit passing through the entire height of housing 2 thus facilitating steam heating of the sample introduced and of the internals of the filter element; the quick-opening valve can be positioned in a separate conduit in open communication with the inlet surface of the filter rather than being positioned in a portion of the inlet conduit to the filter.

Similarly, the system can be adapted for use in a bag-filter operation, such as separating carbon black from product gases, in which the filters are positioned within an enclosure, the filtered continuous phase passing into the enclosure, reverse flow from the enclosure into the bag being affected in such low pressure systems by suddenly creating a vacuum through the quick-opening means. Similarly, it is possible to employ an extraneous stream, different from that passed through the filter in the filtering process, for back-flowing through the filter to remove to solid phase from the foraminous surface. In this instance, a separate line for the introduction of the extraneous stream, complete with the necessary valves, will be adapted to discharge back through the filter as necessary to affect cleaning.

These, and such other modifications as they will suggest, are considered, however, as being within the scope of the invention.

What is claimed is:

1. An apparatus for filtering a gas comprising a housing having a bottom wall and a tubular side wall and a detachably-secured top wall, a conduit connected centrally of the bottom wall, said conduit having an inlet for gas in the side thereof including a valve, a quick-acting valve positioned in said conduit beneath said inlet for reversal of gas flow and a porous filter container connected to said conduit beneath said quick-acting valve, a rigid tubular filter closed at the top positioned within said housing in spaced relationship from said side wall to define an annulus, said tubular filter being open at the bottom and secured to said bottom wall of said housing about said conduit opening, means securing said tubular filter about said conduit opening and an outlet in said housing positioned radially outwardly of said tubular filter for removal of clean gas.

2. The apparatus of claim 1 in which said tubular filter is closed by a top wall and said means securing said tubular filter about said conduit opening comprises a spring positioned in compressive contact relationship with said top wall of said housing and with said top wall of said tubular filter.

3. The apparatus of claim 1 in which said tubular filter is closed by a top wall and said means securing said tubular filter about said conduit opening comprises a rod extending from said top wall of said tubular filter into said conduit, said rod being anchored by a hinge positioned in said conduit.

4. The apparatus of claim 3 in which said rod extends through said top wall of said tubular filter and said hinge is positioned in said conduit between said inlet for gas in the side thereof and said quick-acting valve.

(References on following page)

References Cited

UNITED STATES PATENTS

| | | | |
|---|---|---|---|
| 2,892,512 | 6/1959 | Watts et al. | 55—302 |
| 3,146,080 | 8/1964 | Ruble et al. | 55—97 |
| 3,186,551 | 6/1965 | Dornauf | 55—341 |
| 3,266,225 | 8/1966 | Barr | 55—303 |
| 3,325,979 | 6/1967 | Smith | 55—302 |
| 3,383,840 | 5/1968 | Johnson et al. | 55—293 |
| 3,397,515 | 8/1968 | Johnson | 55—302 |
| 3,411,929 | 11/1968 | Garrett | 55—341 |
| 3,424,501 | 1/1969 | Young | 55—302 |
| 3,008,543 | 11/1961 | Bourdale et al. | 55—334 |
| 3,473,300 | 10/1969 | Wilm et al. | 55—302 |

OTHER REFERENCES

German printed application 1,001,465 dated January 1957.

FRANK W. LUTTER, Primary Examiner

B. NOZICK, Assistant Examiner

U.S. Cl. X.R.

55—523